ENERGY DETECTOR

Filed May 22, 1956

INVENTORS
ADRIANUS JOHANNES WILHELMUS MARIE VAN OVERBEEK
HEINE ANDRIES RODRIGUES DE MIRANDA
BY
Fred M. Vogel
AGENT 3,001,077

ENERGY DETECTOR

Adrianus Johannes Wilhelmus Marie van Overbeek and Heine Andries Rodrigues de Miranda, both of Eindhoven, Netherlands, assignors, by mesne assignments, to North American Philips Company, Inc., New York, N.Y., a corporation of Delaware Filed May 22, 1956, Ser. No. 586,499
Claims priority, application Netherlands May 26, 1955
5 Claims. Cl. 250—211)

This invention relates to energy-detectors comprising a transistor, for example a radiation-detector comprising a photo-transistor, for detecting minute variations of a quantity of incident light particles, whether or not electrically charged or radio-active radiations, the output circuit of the transistor comprising or controlling, for example, a relay or a measuring apparatus.

In accordance with the invention, the base of the transistor is connected through an impedance, which is high with regard to the base-emitter forward resistance but low with respect to the base-emitter inverse resistance, to a source which biases the base in the cut-off direction. Thus, as the level of the external energy supplied to the transistor increases, the cut-off bias voltage of the base is overcome when the increasing leakage current to the base exceeds a predetermined threshold level, so that the collector current then abruptly rapidly increases.

In order that the invention may be readily carried into effect examples will now be described in detail with reference to the accompanying drawing, in which.

Figure 1:
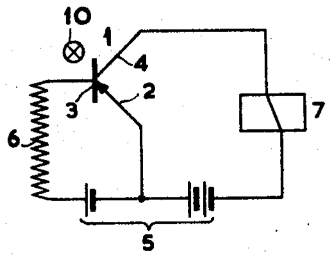
FIG. 1 is a wiring diagram of a first embodiment.

The embodiment shown in FIG. 1 comprises a transistor 1 of PNP type, the emitter 2 of which is connected to a tapping point of a voltage source 5. Between the base 3 of the transistor and the positive terminal of the source 5 is connected a resistor 6, the impedance of which is high with respect to the base-emitter forward resistance, but low with regard to the base-emitter inverse resistance. The collector 4 of the transistor 1 is connected to the negative terminal of the source 5 by way of the winding of a relay 7.

The transistor 1 may, for example, be a phototransistor consisting of a germanium crystal which is exposed to the radiation to be detected.

Normally, the transistor is cut off by that part of the source 5 which is connected between the emitter and the base. However, a small leakage current flows from the base 3 to the collector 4. On supplying energy, for example thermal energy or light or another form of radiant energy, from a source 10 to the transistor 1, the leakage current increases in accordance with said energy. This involves a higher voltage drop across the resistor 6, thereby diminishing the biasing voltage of the base with respect to the emitter. When the energy supplied to the transistor exceeds a threshold level, the cut-off voltage at the base 3 is overcome and the collector current abruptly rapidly increases because the emitter-collector circuit is no longer cut-off. This heavy collector current energizes the relay 7. The resistor 6 should thereby fulfill the aforesaid condition in order that the leakage current be conducted substantially entirely through it during the cut-off period of the transistor 1 but be substantially entirely available for unblocking the transistor 1 during its conductive period.

Figure 2:
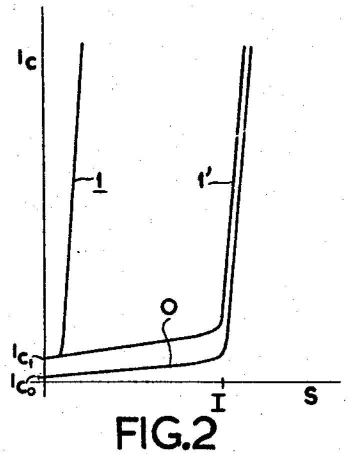
FIG. 2 shows a collector-current versus control-energy characteristic for explaining the operation of the embodiment of FIG. 1.

The curve shown in FIG. 2 illustrates the relationship existing between the collector current $I_c$ and the intensity S of the energy supplied to the transistor 1, for example the incident radiation energy falling on a phototransistor (curve O). The relay 7 becomes energized if the radiation intensity exceeds the bend of the curve (intensity I). Various other curve forms are obtainable. For measuring purposes, for instance, the slope of the abruptly rising branch of the curve may be reduced by inserting a series-resistor in the emitter circuit. Alternatively, said slope may be rendered steeper by connecting in cascade a second non-irradiated transistor, the output of which is fed back in the positive sense, for instance to the base of the transistor 1, thus forming a trigger circuit in combination with transistor 1.

In a practical embodiment, the resistor 6 had a value of 10 to 20 kilohms, the resistance of the relay 7 had a value of 2 kilohms, and the base biasing portion of the source 5 had a value of 1.5 volts and the collector biasing portion had a value of 6 volts.

Figure 3:
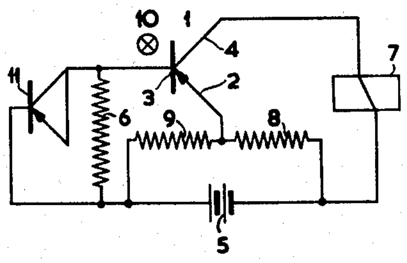
FIG. 3 is a wiring diagram of a second embodiment.

The embodiment shown in FIG. 3 operates in substantially the same manner as the aforesaid embodiment. The transistor 1 is a photo-transistor adapted to be irradiated with a variable intensity by a light-source 10. The tapping point of the voltage source 5 is however replaced by a voltage divider 8, 9 to which the emitter 2 is connected.

An increase in temperature of the transistor 1 is tantamount to supplying energy to this transistor, so that the detector shown in FIG. 1 is also temperature-responsive and may, for instance, be used as a thermostat. An increase of temperature corresponds to a shift of the $I_c$—S curve shown in FIG. 2, for example from curve O to curve 1. In the case of a thermostat, for instance, the relay 7 will become energized if the steep part of the shifted curve intersects the ordinate axis. In other words, a temperature scale may be plotted along the horizontal axis.

It may, however, be desirable for the detector to operate exclusively as a radiation detector, that is to say for the relay 7 to become invariably energized at the same given radiation intensity, independently of the temperature. This cannot be achieved unless the voltage across the resistor 6 is stabilized with respect to the temperature. This can be obtained if the value of the resistor 6 varies with temperature in a sense opposite to that of the variation of the collector-base leakage current, so that the product of base current and base resistance remains substantially constant. To this end, the resistor 6 may be replaced by or be connected in parallel or in series with a resistor having a negative temperature coefficient. In the embodiment shown in FIG. 3, this is realized by means of a second transistor 11 connected in the inverse direction and in parallel with the resistor 6 said transistor 11 being insensitive with respect to radiations from the source 10.

If the transistor 1 is not irradiated a leakage current, for instance $I_{co}$ passes through its base-collector circuit and a part of this current also passes through the base-collector circuit of the transistor 11. Upon an increase in temperature, the leakage current through the transistor 1 increases and becomes $I_{c1}$, for instance, (curve 1 shown in FIG. 2). However, the leakage current through the transistor 11 increases approximately by an amount $I_{c1}$ minus $I_{co}$, so that the voltage across the resistor 6 remains substantially constant and the energy-detector operates according to the curve 1', the bend of which substantially corresponds to the same radiation intensity I as that of the curve O. Hence, the relay 7 becomes energized at substantially the same radiation intensity.

Figure 4:
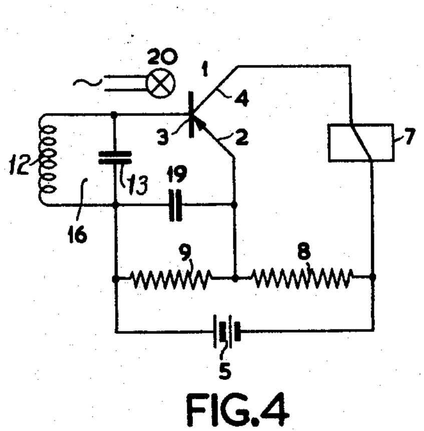
FIG. 4 shows the wiring diagram of a third embodiment.

The embodiment shown in FIG. 4 comprises a phototransistor 1 adapted to be irradiated by a modulated light-source 20. The light source 20 may, for instance, be a small electric lamp, supplied with alternating current of a given frequency. The resistor 6 forming part of the embodiments already described is replaced by an oscillating circuit 16, comprising a coil 12 and a capacitor 13, which is tuned to a frequency equal to twice the frequency of the supply current for the lamp 20, that is to say to the modulation frequency of the radiation of this lamp. Alternatively, this radiation may be intercepted periodically by a chopper, for instance. With respect to this frequency, the circuit 16 has an impedance which is high with regard to the base-emitter forward resistance but low with respect to the base-emitter inverse resistance. In order to avoid negative feed-back of the modulation frequency, the resistor 9 is short-circuited by a capacitor 19.

When the transistor 1 is irradiated, its leakage current varies with the modulation frequency of the light from the lamp 20. Hence, the alternating current component of the modulated leakage current produces a corresponding alternating voltage across the circuit 16. If the amplitude of the radiation intensity increases, heavier current pulses pass from the base 3 to the collector 4. As a result the cut-off bias voltage applied to the base 3 is overcome during part of the half periods of the modulation frequency, so that a heavy current flows from the emitter 2 to the collector 4 and the collector current increases abruptly. Consequently, the circuit 16 is only slightly damped by the currents produced. Due to the absence of ohmic resistances in the base circuit is this detector substantially insensitive to fluctuations of the temperature and of the mean radiation intensity, so that it is for instance also suitable for intensity measurement by daylight.

These detectors may be used for a variety of purposes. In combination with a light-source they may, for instance, be alternatively employed for counting passing vehicles, or as smoke detectors, for instance to give fire alarm, or in automatic dimming devices. Together with a given source of radiation they may be used for radiation or absorption measurements. In this case the moving coil of a measuring device may be substituted for the winding of the relay 7. As an alternative, a detector comprising a relay in combination with a gauged absorption wedge may be used for radiation intensity or absorption measurements. Furthermore, it may be used as a radiation thermostat, whereby the transistor is a photo-transistor and the detector is responsive to radiation from a given object.

What is claimed is:

1. A radiation intensity indicating circuit arrangement comprising a transistor having emitter and base electrodes defining an input electrode system and a collector electrode defining with one of said electrodes an output electrode system, said transistor undergoing variations in collector current in response to radiations impinging thereon, means for impinging radiations on said transistor, means for biasing the base electrode of said transistor to a substantially non-conductive condition whereby a relatively small leakage current flows through the said transistor, impedance means connected in said input electrode system for conducting said leakage current when said transistor is in said substantially non-conductive condition and for providing a voltage sufficient to bias said transistor to a conductive condition upon the intensity of said impinging radiations increasing to a magnitude sufficient to cause said leakage current to increase to a point at which the said leakage current exceeds a predetermined value, said impedance means having an impedance value which is high relative to the base-emitter forward resistance of said transistor and which is low relative to the base-emitter inverse resistance of said transistor, said transistor in said conductive condition providing a collector current of sharply increasing magnitude, and utilization means responsive to said collector current and coupled to said output electrode system.

2. A radiation intensity indicating circuit arrangement comprising a transistor having emitter and base electrodes defining an input electrode system and a collector electrode defining with one of said electrodes an output electrode system, said transistor undergoing variations in collector current in response to radiations impinging thereon, means for impinging radiations on said transistor, means for biasing the base electrode of said transistor to a substantially non-conductive condition whereby a relatively small leakage current flows through the said transistor, resistance means connected in said input electrode system for conducting said leakage current when said transistor is in said substantially non-conductive condition and for providing a voltage sufficient to bias said transistor to a conductive condition upon the intensity of said impinging radiations increasing to a magnitude sufficient to cause said leakage current to increase to a point at which the said leakage current exceeds a predetermined value, said resistive means comprising a resistor having a resistance value which is high relative to the base-emitter forward resistance of said transistor and which is low relative to the base-emitter inverse resistance of said transistor, said transistor in said conductive condition providing a collector current of sharply increasing magnitude, and utilization means responsive to said collector current and coupled to said output electrode system.

3. A radiation intensity indicating circuit arrangement comprising a transistor having emitter and base electrodes defining an input electrode system and a collector electrode defining with one of said electrodes an output electrode system, said transistor undergoing variations in collector current in response to radiations impinging thereon, means for impinging radiations on said transistor, means for biasing the base electrode of said transistor to a substantially non-conductive condition whereby a relatively small leakage current flows through the said transistor, resistance means connected in said input electrode system for conducting said leakage current when said transistor is in said substantially nonconductive condition and for providing a voltage sufficient to bias said transistor to a conductive condition upon the intensity of said transistor, said transistor in said conductive consufficient to cause said leakage current to increase to a point at which the said leakage current exceeds a predetermined value, said resistive means comprising a resistor having a resistance value which is high relative to the base-emitter forward resistance of said transistor and which is low relative to the base-emitter inverse resistance of said transistor, said transistor in said conductive condition providing a collector current of sharply increasing magnitude, means for stabilizing the voltage across said resistor with respect to temperature comprising resistance means having a negative temperature coefficient interposed in said input electrode system, and utilization means responsive to said collector current and coupled to said output electrode system.

4. A radiation intensity indicating circuit arrangement comprising a transistor having emitter and base electrodes defining an input electrode system and a collector electrode defining with one of said electrodes an output electrode system, said transistor undergoing variations in collector current in response to radiations impinging thereon, means for impinging radiations on said transistor, means for biasing the base electrode of said transistor to a substantially non-conductive condition whereby a relatively small leakage current flows through the said transistor, resistance means connected in said input electrode system for conducting said leakage current when said transistor is in said substantially non-conductive condition and for providing a voltage sufficient to bias said transistor to a conductive condition upon the intensity of said impinging radiations increasing to a magnitude sufficient to cause said leakage current to increase to a point at which the said leakage current exceeds a predetermined value, said resistive means comprising a resistor having a resistance value which is high relative to the base-emitter forward resistance of said transistor and which is low relative to the base-emitter inverse resistance of said transistor, said transistor in said conductive condition providing a collector current of sharply increasing magnitude, means for stabilizing the voltage across said resistor with respect to temperature comprising a second transistor coupled across said resistor in a manner whereby said second transistor is substantially non-conductive, said second transistor being non-responsive to radiations impinging thereon, and utilization means responsive to said collector current and coupled to said output electrode system.

5. A radiation intensity indicating circuit arrangement comprising a transistor having emitter and base electrodes defining an input electrode system and a collector electrode defining with one of said electrodes an output electrode system, said transistor undergoing variations in collector current in response to radiations impinging thereon, means for impinging radiations on said transistor, said radiations being modulated at a given frequency, means for biasing the base electrode of said transistor to a substantially non-conductive condition whereby a relatively small leakage current flows through the said transistor, impedance means connected in said input electrode system for conducting said leakage current when said transistor is in said substantially non-conductive condition and for providing a voltage sufficient to bias said transistor to a conductive condition upon the intensity of said impinging radiations increasing to a magnitude sufficient to cause said leakage current to increase to a point at which the said leakage current exceeds a predetermined value, said impedance means comprising a tuned circuit tuned to said given frequency and having an impedance value at said given frequency which is high relative to the base-emitter forward resistance of said transistor and which is low relative to the base-emitter inverse resistance of said transistor, said transistor in said conductive condition providing a collector current of sharply increasing magnitude, and utilization means responsive to said collector current and coupled to said output electrode system.

References Cited in the file of this patent

UNITED STATES PATENTS

| | | |
|---|---|---|
| 2,556,296 | Rack | June 12, 1951 |
| 2,570,978 | Pfann | Oct. 9, 1951 |
| 2,691,736 | Haynes | Oct. 12, 1954 |
| 2,862,109 | Kruper | Nov. 25, 1958 |

OTHER REFERENCES

Stansel: "Transistor Equations," Electronics, March 1953, pp. 156–158.

Sulzer: "Junction Transistor," Electronics, August 1953, pp. 170–173.

UNITED STATES PATENT OFFICE

CERTIFICATE OF CORRECTION

Patent No. 3,001,077 September 19, 1961

Adrianus Johannes Wilhelmus Marie van Overbeek et al.

It is hereby certified that error appears in the above numbered patent requiring correction and that the said Letters Patent should read as corrected below.

Column 4, line 45, strike out "transistor, said transistor in said conductive con-" and insert instead -- impinging radiations increasing to a magnitude --.

Signed and sealed this 3rd day of April 1962.

(SEAL)
Attest:

ERNEST W. SWIDER
Attesting Officer

DAVID L. LADD
Commissioner of Patents